US010715505B2

(12) United States Patent
Amulothu et al.

(10) Patent No.: US 10,715,505 B2
(45) Date of Patent: *Jul. 14, 2020

(54) END-TO-END ENCRYPTION IN A SOFTWARE DEFINED NETWORK

(71) Applicant: International Business Machines Corporation, Armonk, NY (US)

(72) Inventors: Venkata Siva N. Amulothu, RTP, NC (US); Nitin J. Huralikuppi, Santa Clara, CA (US); Ashish Kapur, San Jose, CA (US); Vishal Shukla, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,756

(22) Filed: Apr. 11, 2019

(65) Prior Publication Data

US 2019/0245834 A1 Aug. 8, 2019

Related U.S. Application Data

(63) Continuation of application No. 14/525,339, filed on Oct. 28, 2014, now Pat. No. 10,375,043.

(51) Int. Cl.
*H04L 29/06* (2006.01)
*H04L 9/14* (2006.01)

(52) U.S. Cl.
CPC ........... *H04L 63/0485* (2013.01); *H04L 9/14* (2013.01); *H04L 63/0272* (2013.01); *H04L 63/0428* (2013.01); *H04L 63/06* (2013.01); *H04L 63/20* (2013.01)

(58) Field of Classification Search
CPC ............ H04L 63/0485; H04L 63/0272; H04L 63/0428; H04L 63/06; H04L 63/20; H04L 9/14
See application file for complete search history.

(56) References Cited

U.S. PATENT DOCUMENTS

| 6,948,060 B1* | 9/2005 | Ramanathan | H04L 63/0428 713/153 |
| 7,010,681 B1* | 3/2006 | Fletcher | H04L 63/0428 713/154 |
| 7,758,877 B2* | 7/2010 | Asotra | A61K 9/0095 424/400 |

(Continued)

OTHER PUBLICATIONS

List of All IBM Related Applications, Appendix P, 2019.

*Primary Examiner* — John B King
(74) *Attorney, Agent, or Firm* — Garg Law Firm, PLLC; Rakesh Garg; Stephanie Carusillo

(57) ABSTRACT

A first information comprising an identification of an encryption algorithm supported by a first component from the first component of a software defined network (SDN) is received at a controller of the SDN. A set of policies and a set of encryption algorithms are sent to the first component. A policy determines a cryptographic operation applicable to a path in the SDN between the first component and a second component of the SDN. The first component comprises an originating point of the path and the second component comprises a destination point of the path.

20 Claims, 11 Drawing Sheets

(56) References Cited

U.S. PATENT DOCUMENTS

| | | | | |
|---|---|---|---|---|
| 8,995,274 B2* | 3/2015 | Hong | ............... | H04L 45/00 370/229 |
| 9,185,088 B1* | 11/2015 | Bowen | ............... | H04L 63/0471 |
| 2003/0041091 A1* | 2/2003 | Cheline | ............ | H04L 29/12066 709/200 |
| 2010/0263023 A1* | 10/2010 | Xiao | ............... | H04L 41/0893 726/3 |
| 2012/0079266 A1* | 3/2012 | Ogata | ............... | H04L 63/0428 713/150 |
| 2012/0159183 A1* | 6/2012 | Adams | ............... | G06F 21/577 713/189 |
| 2013/0238785 A1* | 9/2013 | Hawk | ............... | G06F 9/5072 709/224 |
| 2014/0003232 A1* | 1/2014 | Guichard | ............ | H04L 67/1029 370/230 |
| 2014/0019579 A1* | 1/2014 | Motwani | ........... | H04L 29/08549 709/216 |
| 2014/0052877 A1* | 2/2014 | Mao | ............... | H04L 61/103 709/245 |
| 2014/0108783 A1* | 4/2014 | Suzuki | ............... | H04L 63/0428 713/155 |
| 2014/0123572 A1* | 5/2014 | Segall | ............... | G09B 9/003 52/79.5 |
| 2014/0153572 A1* | 6/2014 | Hampel | ............... | H04L 12/6418 370/392 |
| 2014/0189074 A1* | 7/2014 | Parker | ............... | H04L 63/20 709/220 |
| 2014/0195798 A1* | 7/2014 | Brugger | ............... | H04L 63/0227 713/154 |
| 2015/0124809 A1* | 5/2015 | Edsall | ............... | H04L 47/20 370/390 |
| 2015/0199496 A1* | 7/2015 | Deter | ............... | G06F 21/00 726/1 |
| 2015/0358850 A1* | 12/2015 | La Roche, Jr. | ... | H04W 28/0215 370/328 |
| 2015/0381578 A1* | 12/2015 | Thota | ............... | H04L 63/0428 713/168 |
| 2016/0020946 A1* | 1/2016 | Morper | ............... | H04W 12/00 709/222 |
| 2016/0149903 A1* | 5/2016 | Suh | ............... | H04L 63/0428 713/156 |

* cited by examiner (PRIOR-ART)

END-TO-END ENCRYPTION IN A SOFTWARE DEFINED NETWORK

TECHNICAL FIELD

The present invention relates generally to a method, system, and computer program product for securing data communications in a software defined network. More particularly, the present invention relates to a method, system, and computer program product for end-to-end encryption in a software defined network.

BACKGROUND

A data processing environment comprises a variety of hardware, software, and firmware networking components. A physical network, also called an underlay, is a network defined using such components.

Techniques are available presently to construct a logical network, also known as a software defined network (SDN) overlay (hereinafter interchangeably, "SDN" or "overlay"), from such networking components. Essentially, networking components are abstracted into corresponding logical or virtual representations, and the abstractions are used to define the SDN. In other words, an SDN is a logical network formed and operated using logical representations of underlying networking components.

Physical networks usually exist within the demarcated boundary of the data processing environment whose networking components are utilized in the physical network. Unlike a physical network, an SDN can be designed to span across one or more data processing environment. For example, while a physical network may be contained within a datacenter, an SDN may span across one or more datacenters.

As an example, a logical representation of a hypervisor can participate in an SDN, such that a function attributed to the logical representation of the hypervisor in the SDN is actually performed by the underlying hypervisor component in the underlay. Similarly, a logical representation of a networking gateway can participate in an SDN, such that a function attributed to the logical representation of the networking gateway in the SDN is actually performed by the underlying networking gateway component in the underlay.

In an SDN, because the actual networking components that perform the networking functions are abstracted into logical entities representing the networking functionality offered by those components and not the actual implementations of those functionalities, something is needed to direct those networking functionalities into a functioning logical network. An SDN controller is a component that manages and operates the logical networking components within an SDN.

Henceforth in this disclosure, any reference to a component within the context of an SDN is a reference to a logical representation of the component, which participates in the SDN, unless expressly distinguished where the reference is made. For example, a reference to a hypervisor in communication with an SDN controller is a reference to a logical representation of the hypervisor that operates in the SDN managed by the SDN controller and not to the hypervisor component of a machine that actually performs the tasks commanded by the SDN controller.

A virtual machine (VM) comprises virtualized representations of real hardware, software, and firmware components available in a data processing system. The data processing system can have any number of VMs configured thereon, and can utilize any number of virtualized components therein. The data processing system is also referred to as a computing node, a compute node, a node, or a host.

For example, the host may include a processor component. One virtual representation of the processor can be assigned to one VM, and another virtual representation of the same processor can be assigned to another VM, both VMs executing on the host. Furthermore, the second VM may also have access to a virtual representation of a reserve processor in the host and certain other resources, either exclusively or in a shared manner with the first VM.

Certain data processing systems are configured to process several workloads simultaneously. For example, separate virtual data processing systems, such as separate VMs, configured on a single host data processing system often process separate workloads for different clients or applications.

In large scale data processing environments, such as in a data center, thousands of VMs can be operating on a host at any given time, and hundreds if not thousands of such hosts may be operational in the data center at the time. A virtualized data processing environment such as the described data center is often referred to as a "cloud" that provides computing resources and computing services to several clients on an as-needed basis.

Presently available methods for data communication in an SDN allow data to be exposed to snooping or tampering, or to otherwise remain accessible in plain text or original form, at least in some segments of the SDN. Such exposure of the data is undesirable.

For example, assume that a VM is operating in a host data processing system. A hypervisor component available to the host facilitates the data communication to and from the VM. For example, the VM sends a data packet to the hypervisor, the hypervisor sends the packet to a gateway component, and the gateway component encrypts the packet and sends the encrypted packet to a destination system.

In an SDN, the hypervisor and the gateway described above are logically represented and operate to provide the functionality described above in a similar manner. A hypervisor in a given SDN similarly hands off the data packet to a gateway in the SDN or another hypervisor in the SDN.

Presently, at least in a part of a given SDN, the data packet travels essentially a plain text form. For example, the SDN segment from the hypervisor to the gateway may be a part of a local area network (LAN), e.g., a cloud network in a data center that participates in a given cloud architecture. At least in this segment, the data packet sent by the hypervisor remains without encryption. For example, in this segment, a cloud component can snoop the data packet or perform a deep inspection of the data of the packet.

Similarly, one hypervisor in one host can receive a packet from one VM, handoff the packet to another hypervisor in another host, the other hypervisor delivering the packet to another VM in the other host. In this example as well, the segment between the two hypervisors in the SDN may allow the data of the packet to be maliciously or otherwise undesirably read in transit.

Presently, SDNs do not include a provision to perform end-to-end encryption of data. End-to-end encryption comprises encrypting the data of a data packet at the first component in an SDN path of the data packet, and decrypting the data at the last component in the SDN path, where the first and the last component are both managed by the same SDN controller. An SDN path is also known as an "SDN flow," or simply "flow."

For example, if a data packet originates at a VM in a host on a LAN and the destination of the packet is another VM in another host in the LAN, the first component of the SDN that handles the packet in the flow is the hypervisor at the originating host, and the last component that handles the packet in the flow is the hypervisor at the destination host. Communications between the VM and the hypervisor at each host are internal or local to the host and not a part of the SDN.

Similarly, if a data packet originates at a VM in a host on a LAN and the destination of the packet is a machine or component outside the LAN, e.g., on a wide area network (WAN), the first component of the SDN that handles the packet in the flow is the hypervisor at the originating host, and the last component that handles the packet in the flow is the gateway that transfers the packet from the LAN to the WAN. Communications between the VM and the hypervisor at a host are internal or local to the host and not a part of the SDN. The communication segments after the gateway are also a part of the SDN in that such segments are not under the control of the SDN controller that manages the hypervisor and the gateway.

Further, where a need exists to encrypt data at a hypervisor, custom applications or tools (collectively, "appliances") have to be configured to operate with the hypervisor. Such an appliance also requires a corresponding counterpart appliance to be configured at the other hypervisor to form a pre-determined flow between the two hypervisors. Such custom configuration has to be pre-planned for each flow, and such appliances have to be installed with each participating hypervisor according to the pre-planned flows. Furthermore, the entire custom setup has to be maintained and kept in synchronization so that each appliance at each end of a given flow uses the exact same encrypting algorithm to successfully encrypt and decrypt the packets over the flow.

Thus, the presently-available SDN configuration does not have any standardized form of end-to-end encryption method. Further, any custom mechanism to encrypt data in an SDN segment suffers from numerous drawbacks, some of which are described above.

SUMMARY

The illustrative embodiments provide a method, system, and computer program product for end-to-end securing of data communications in a software defined network. An embodiment includes a method for end-to-end securing of data communications in a Software Defined Network (SDN). The embodiment receives, at a controller of the SDN, first information from a first component of the SDN, the first information comprising an identification of an encryption algorithm supported by the first component. The embodiment sends, to the first component, a set of policies and a set of encryption algorithms, wherein a policy in the set of policies determines a cryptographic operation applicable to a path in the SDN between the first component and a second component of the SDN, wherein the first component comprises an originating point of the path and the second component comprises a destination point of the path. Thus, the embodiment enables an SDN controller to manage and direct end-to-end encryption in the SDN, where prior-art SDN controllers have no such control over the encryption in SDN flows, and at least a portion of an SDN flow exposes unsecured data to malicious or otherwise undesirable snooping or examination.

Another embodiment further detects, at the controller, an availability of a third component of the SDN. The embodiment further selects, responsive to detecting the availability of the third component, a second set of policies. The embodiment further updates the set of policies with the second set of policies, such that a policy in the second set of policies determines a second cryptographic operation applicable to a second path in the SDN between the first component and the third component of the SDN, wherein the first component comprises an originating point of the second path and the third component comprises a destination point of the second path. Thus, the embodiment enables an SDN controller to continue managing and directing end-to-end encryption in the SDN as participation in the SDN changes, where prior-art SDN controllers have no such control over the encryption in SDN flows.

Another embodiment further causes, responsive to sending the set of policies and the set of encryption algorithms, the first component to use a policy from the set of policies to perform a cryptographic operation on a data packet using an encryption algorithm determined by the policy, forming a secure data packet, a destination of the data packet being associated with the second component and reachable via the path in the SDN. Thus, the embodiment enables an SDN controller to cause SDN components at the ends of SDN flows to perform end-to-end encryption in the SDN, where prior-art SDN controllers have no such control over the encryption in SDN flows.

Another embodiment further causes, responsive to sending the set of policies and the set of encryption algorithms, the first component to construct an unencrypted header, wherein the unencrypted header is usable to route the secure data packet to the second component in the SDN. The embodiment further causes the first component to transmit the secure data packet with the unencrypted header on the path in the SDN to the second component. Thus, the embodiment enables an SDN controller to cause SDN components at the ends of SDN flows to perform end-to-end encryption in the SDN while maintaining the routability of the secured data in the SDN flows, where prior-art SDN controllers have no such control over the encryption in SDN flows.

Another embodiment further performs a cryptographic operation, at the controller, using a pre-negotiated encryption algorithm, the set of policies and the set of encryption algorithms, wherein the pre-negotiated encryption algorithm is pre-negotiated between the controller and the first component. Thus, the embodiment enables an SDN controller to securely communicate with SDN components at the ends of SDN flows to cause end-to-end encryption in the SDN, where prior-art SDN controllers do not securely communicate with SDN components to control the encryption in SDN flows.

Another embodiment further sends, to the first component, a set of encryption keys, wherein an encryption key in the set of encryption keys corresponds to an encryption algorithm in the set of encryption algorithms. Thus, the embodiment further enhances an SDN controller to manage and direct end-to-end encryption in the SDN, where prior-art SDN controllers have no such control over the encryption in SDN flows.

In another embodiment, the policy determining the cryptographic operation comprises the policy identifying a second encryption algorithm, and wherein the second encryption algorithm performs the determined cryptographic operation on data on the path. Thus, the embodiment further enhances an SDN controller to manage and direct end-to-end encryption in the SDN, where prior-art SDN controllers have no such control over the encryption in SDN flows.

In another embodiment, the set of encryption algorithms includes the encryption algorithm. Thus, the embodiment further enhances an SDN controller to manage and direct end-to-end encryption in the SDN, where prior-art SDN controllers have no such control over the encryption in SDN flows.

Another embodiment further includes an indication of an availability of a cryptographic capability at the first component. Thus, the embodiment further enables an SDN controller to manage and direct end-to-end encryption in the SDN, where prior-art SDN controllers have no such control over the encryption in SDN flows.

Another embodiment further receives, at the controller, an indication that the first component is available for data communications in the SDN. Thus, the embodiment further enhances an SDN controller to manage and direct end-to-end encryption in the SDN, where prior-art SDN controllers have no such control over the encryption in SDN flows.

In another embodiment, the first component comprises a logical representation of a component of a physical network, wherein the SDN comprises a virtual network logically overlaid on the physical network. Thus, the embodiment further enhances an SDN controller to manage and direct end-to-end encryption in the SDN, where prior-art SDN controllers have no such control over the encryption in SDN flows.

In another embodiment, the first component comprises a logical representation of a hypervisor, the hypervisor operating in a data processing system accessible over the SDN. Thus, the embodiment further enhances an SDN controller to manage and direct end-to-end encryption in the SDN, where prior-art SDN controllers have no such control over the encryption in SDN flows.

Another embodiment includes a method for end-to-end securing of data communications in a Software Defined Network (SDN). The embodiment sends, from a first component of the SDN to a controller of the SDN, first information comprising an identification of an encryption algorithm supported by the first component. The embodiment receives, at the first component, a set of policies and a set of encryption algorithms, wherein a policy in the set of policies determines a cryptographic operation applicable to a path in the SDN between the first component and a second component of the SDN, wherein the first component comprises an originating point of the path and the second component comprises a destination point of the path. The embodiment saves, responsive to receiving, the set of policies and the set of encryption algorithms in a repository associated with the first component. The embodiment performs a cryptographic operation, using a policy from the set of policies, on a data packet using to an encryption algorithm determined by the policy, forming a secure data packet, a destination of the data packet being associated with the second component and reachable via the path in the SDN. Thus, the embodiment enables an SDN component at an end of an SDN flow to perform, under the control of an SDN controller, end-to-end encryption in the SDN, where prior-art SDN controllers have no such control over the encryption in SDN flows, and at least a portion of an SDN flow exposes unsecured data to malicious or otherwise undesirable snooping or examination.

Another embodiment further constructs, responsive to performing the cryptographic operation, an unencrypted header, wherein the unencrypted header is usable to route the secure data packet to the second component in the SDN. The embodiment further transmits the secure data packet with the unencrypted header on the path in the SDN to the second component. Thus, the embodiment further enhances an SDN component at an end of an SDN flow to perform, under the control of an SDN controller, end-to-end encryption in the SDN flow.

Another embodiment further determines, whether any policy in the set of policies applies to the path between the first component and the second component in the SDN. The embodiment further selects, responsive to determining that the policy in the set of policies applies to the path, the policy from the set of policies. The embodiment further executes the policy to identify the encryption algorithm in the set of encryption algorithms. Thus, the embodiment further enhances an SDN component at an end of an SDN flow to perform, under the control of an SDN controller, end-to-end encryption in the SDN flow.

Another embodiment includes a computer program product for end-to-end securing of data communications in an SDN. Another embodiment includes a computer system for end-to-end securing of data communications in an SDN.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
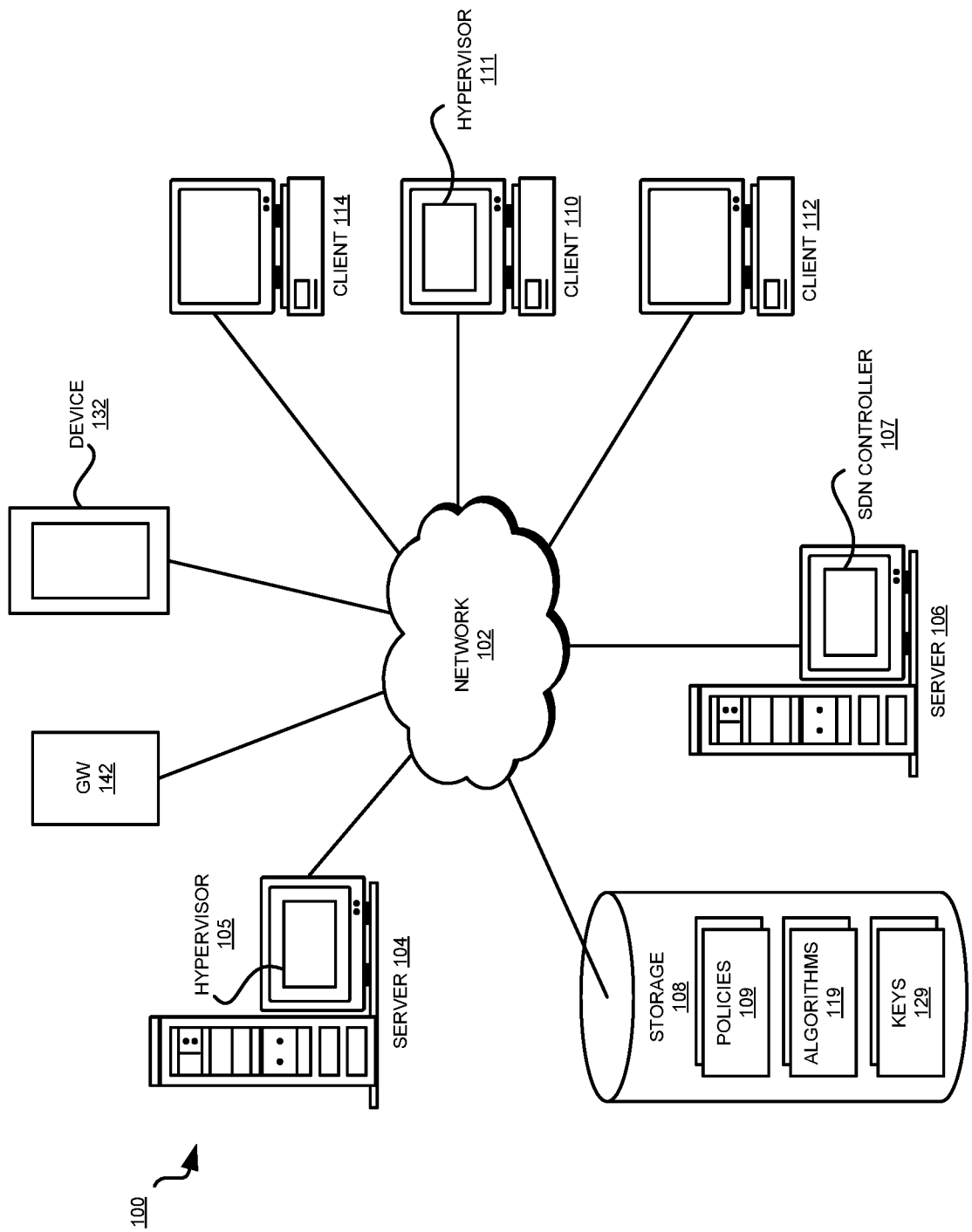
FIG. 1 depicts a block diagram of a network of data processing systems in which illustrative embodiments may be implemented.

Within the scope of the illustrative embodiments, any variation of the term "encrypt" is contemplated to include any suitable cryptographic operation, including but not limited to encoding using a cipher, signing using an identity, changing an encoding using a different cipher, and other cryptographic operations. For example, the term "encryption algorithm" within the scope of the illustrative embodiments also includes algorithms usable for signing data or for performing another cryptographic operation with respect to the data, with or without transforming the data to encoded data according to a cipher. Similarly, the term "encrypted data" within the scope of the illustrative embodiments also includes signed data, encoded data according to a cipher, or other cryptographically manipulated data. Generally, within the scope of the illustrative embodiments, any use of the term "encrypt" or a variation thereof in conjunction with another artifact contemplates any suitable cryptographic operation usable with that artifact.

The illustrative embodiments used to describe the invention generally address and solve the above-described problems and other problems related to data security in SDNs. The illustrative embodiments provide a method, system, and computer program product for end-to-end encryption in a software defined network.

An embodiment can be implemented in software to modify an existing SDN controller or to otherwise operate in conjunction with an existing SDN controller to form a modified SDN controller. Another embodiment or a part thereof can be implemented in hardware or firmware to modify an existing SDN controller or to otherwise operate in conjunction with an existing SDN controller to form a modified SDN controller.

Another embodiment can be implemented in software to modify an existing hypervisor or to otherwise operate in conjunction with an existing hypervisor to form a modified hypervisor. Another embodiment or a part thereof can be implemented in hardware or firmware to modify an existing hypervisor or to otherwise operate in conjunction with an existing hypervisor to form a modified hypervisor.

Similarly, and generally, an embodiment can be implemented in software to modify an existing SDN component or to otherwise operate in conjunction with an existing SDN component to form a modified SDN component. Another embodiment or a part thereof can be implemented in hardware or firmware to modify an existing SDN component or to otherwise operate in conjunction with an existing SDN component to form a modified SDN component.

For example, only for the clarity of the descriptions of the various embodiments, certain operations and functions of the various embodiments are described herein with respect to SDN components that participate in an overlay. The illustrative embodiments are not limited, however, to only overlay components. For example, a prior-art SDN controller can access components in the underlay as well. Accordingly, an embodiment can be used, or can be adapted for use with one or more underlay components, alone or in conjunction with one or more overlay components.

As an example, an embodiment described herein performs enables an overlay component, e.g., a hypervisor, to perform end-to-end encryption at the beginning end of a flow through an overlay. Such an embodiment is also usable to similarly perform end-to-end encryption and decryption at an underlay component which occupies the beginning end of a flow through the underlay.

A switch is an example of such an underlay component that can be advantageously modified using an embodiment. The underlay switches that are modifiable in this manner can be physical switches, virtual switches, or both. Underlay components other than switches that occupy the originating and terminating ends of a flow through the underlay are similarly modifiable using an embodiment within the scope of the illustrative embodiments.

With the understanding that an embodiment described herein is applicable to an underlay component as well as an overlay component, the descriptions of the embodiments are now presented with respect to example overlay components for clarity. An embodiment, such as in a modified SDN controller, detects that an SDN component, e.g., a modified hypervisor, is available in the SDN network. The embodiment receives information about the encryption capabilities of the SDN component. For example, the SDN component provides a set of identifiers, where each identifier is associated with a particular encryption algorithm, or cipher, that is supported by the SDN component.

In other words, the SDN component informs the embodiment that the component can encrypt a data packet or decrypt an encrypted data packet using any of the ciphers identified in the set of identifiers. An identifier in the set of identifiers may be a name of an algorithm, a code by which the algorithm is known in the SDN, or any other suitable form of identification usable for a similar purpose.

The embodiment maintains a repository of such information received from SDN components that are available in the SDN at any given time. The repository can take any suitable form depending upon the specific implementation of the embodiment, including but not limited to a table. Furthermore, the repository can be situated within the modified SDN controller, or may be accessible from the modified SDN controller, such as over a data network.

As SDN components become available and unavailable in the SDN that the modified SDN controller manages, the embodiment updates the repository. Based on the SDN components and their capabilities represented in the repository at any given time, the embodiment identifies the possible flows from one component to another in the SDN.

A flow can be, but may not necessarily be, governed by one or more policies. A policy comprises logic, implemented in any suitable manner. A set of policies are configured to be available or accessible from a modified SDN controller implementing an embodiment. For example, the modified SDN controller according to one embodiment saves the set of policies in the repository associated with the modified SDN controller.

For example, assume that a policy governs a flow between hypervisor "h1" to hypervisor "h2." Further assume that hypervisor h1 has informed the embodiment that hypervisor h1 supports encryption algorithms "a1," "a2," and "a3." Similarly, assume that hypervisor h2 has informed the embodiment that hypervisor h2 supports encryption algorithms a1, a2, a3, and "a4." An example policy governing a flow between h1 and h2 provides that in that flow, only encryption algorithms "a1" and "a2" can be used. Accordingly, h1 and h2 cannot use algorithm a3 even though the algorithm is available at both hypervisors, and algorithm a4 cannot be used because hypervisor h1 does not support algorithm a4.

Many reasons and purposes can shape a policy usable for governing end-to-end encryption in an SDN according to an embodiment. For example, algorithm a3 in the above example may be a weak encryption algorithm as compared to algorithms a1 and a2, and the flow between h1 and h2 may be expected to carry sensitive data, e.g., financial or personal data, for which at least a minimum level of security has to be maintained during the flow. If algorithm a3 fails to provide at least that minimum level of security, algorithm a3 is excluded by the policy.

Other considerations in designing policies for end-to-end encryption according to the illustrative embodiments include, but are not limited to, computational costs of the various algorithms, availability of encryption keys for certain algorithms, susceptibility of certain algorithms to certain malicious interference expected in a flow, a temporary restriction on the use of a particular encryption capability at a component, and unreliable keys for certain algorithms. Many other technical reasons, business reasons, configuration-related reasons, temporary reasons, or choice-based reasons will be apparent to those of ordinary skill in the art and the same are contemplated within the scope of the illustrative embodiments.

An embodiment executing in a modified SDN controller provides to an available SDN component, information about the capabilities of other available SDN components in the SDN. The available SDN component itself is a modified SDN component according to another embodiment. The embodiment further provides the set of policies, or a subset thereof, to the SDN component.

An optional embodiment further provides the SDN component a set of one or more encryption keys or similarly purposed data. A key in the set of keys is compatible with an encryption algorithm usable by the component in a flow according to a policy provided to the component from the modified SDN controller. In one embodiment the set of keys is available in a repository associated with the modified SDN controller. In another embodiment, the modified SDN controller obtains the set of keys from one or more sources of such keys, such as from an Internet Key Exchange (IKE) or a certificate authority (CA).

An embodiment that provides the capabilities information, the policies, and optionally the keys, from the modified SDN controller to the modified SDN component protects the transmission of such data. For example, one embodiment encrypts the transmission of the data about the capabilities information, the policies, and optionally the keys, from the modified SDN controller to the modified SDN component, using an encryption key or key-pair that is pre-agreed or pre-configured between the modified SDN controller and the modified SDN component. This and other such manners of protecting the transmission from the modified SDN controller further secures the end-to-end encryption in the SDN by protecting the information that is used to provide that end-to-end encryption.

An embodiment executing within or in conjunction with a modified SDN component operating at an end of a flow, such as a modified hypervisor operating in the SDN, saves the information received from the modified SDN controller in a repository. For example, if the modified SDN controller sends encrypted or protected data about the capabilities information, the policies, and optionally the keys, the embodiment decrypts the data and saves the capabilities information, the policies, and optionally the keys in a suitable repository. If the modified SDN controller sends unprotected data about the capabilities information, the policies, and optionally the keys, the embodiment simply saves the capabilities information, the policies, and optionally the keys in a suitable repository.

The repository associated with a modified SDN component can take any suitable form depending upon the specific implementation of the embodiment, including but not limited to a table. Furthermore, the repository can be situated within the modified SDN component, or may be accessible from the modified SDN component, such as over a data network.

An embodiment executing within or in conjunction with the modified SDN component detects a packet of data that is to be transmitted on a flow. The embodiment identifies a destination or target of the packet. The embodiment determines an SDN component that would receive the packet at the other end of the flow, e.g., another modified or unmodified hypervisor, for delivery to the destination, e.g., to a VM associated with that modified or unmodified hypervisor.

The embodiment determines whether a policy governing the flow is available. A policy may not be available for a particular flow for any of several possible reasons. For example, an SDN component at the other end of the flow may not be a modified SDN component, may not support encryption, may not support any encryption algorithms that are common with the transmitting modified SDN component, or a combination of any of these and other reasons.

If a policy is not available, the end-to-end encryption cannot work between the transmitting modified SDN component and the receiving SDN component. Accordingly, the transmitting modified SDN component transmits the data packet as in the prior art.

If a policy is available, the end-to-end encryption according to the illustrative embodiments can be performed in the SDN. The end-to-end encryption can be performed because the transmitting modified SDN component can encrypt the packet using at least one algorithm that is also available at the receiving SDN component, which is also a modified SDN component according to an embodiment.

To perform the end-to-end encryption, the transmitting modified SDN component selects an encryption algorithm according to the policy from one or more encryption algorithms that the policy may permit for the flow. The transmitting modified SDN component uses an encryption key with the selected algorithm. In one embodiment, the key is received from the modified SDN controller. In another embodiment, the transmitting modified SDN component obtains a suitable key for use with the algorithm from a key source, such as from an IKE or a CA on a LAN or WAN.

An embodiment deployed in the modified SDN component uses the key with the selected algorithm to encrypt the data packet. The embodiment constructs a header for the encrypted packet. The header remains in plain text, and is usable by intermediate SDN components in the flow to deliver the encrypted packet to the SDN component at the destination.

The embodiment constructs the header using the information supplied by the sender of the packet, e.g., a VM, in the original packet that the transmitting modified SDN component received from the sender. Thus, the original data packet becomes the encrypted payload of a new packet whose header is the header constructed by the embodiment.

When multiple encryption algorithms are allowed by a policy, which of the multiple algorithms is used for the encryption has to be communicated to the receiving modified SDN component. This communication can occur in a variety of ways, which are contemplated within the scope of the illustrative embodiments. For example, one embodiment uses a pre-agreed bit or set of bits in the header to identify the algorithm that is used to encrypt the packet.

The pre-agreement between the various modified SDN components as to which bit or bits will carry the identification can be implemented in any suitable manner without departing the scope of the illustrative embodiments. One example embodiment used in a modified SDN controller causes the modified SDN controller to broker or dictate such a pre-agreement between the available SDN components.

A new packet constructed in this manner can now leave the transmitting modified SDN component at the originating end of the flow in an encrypted form. Only the receiving modified SDN component is able to decrypt the encrypted payload of the new packet to obtain the data of the original packet sent by the sender.

An embodiment executing within or in conjunction with a receiving modified SDN component receives the new packet with the encrypted payload. The embodiment identifies the encryption algorithm used to encrypt the payload, such as from one or bits in the header of the new packet. The embodiment selects the identified algorithm, and decrypts the encrypted payload.

The decrypted payload provides the receiving modified SDN component the original data of the original packet sent by the sender. The receiving modified SDN component sends the decrypted original packet to the destination, e.g., over a local communication bus in a data processing system where a networking component represented by the modified SDN component and the destination application may be executing.

Thus, the end-to-end encryption according to the illustrative embodiments provides that the actual contents of the original packet cannot be seen, snooped, read, or otherwise accessed at any segment of the SDN flow.

A method of an embodiment described herein, when implemented to execute on a device or data processing system, comprises substantial advancement of the functionality of that device or data processing system in securing data communications in an SDN. For example, where prior-art fails to secure the data of a packet in at least some segments of an SDN flow, an embodiment provides encryption from the first SDN component in the flow to the last SDN component in the flow managed by an SDN controller. Operating in a manner described herein, an embodiment prevents or mitigates the undesirable or malicious snooping or tampering of data communicated over SDNs. Such manner of end-to-end encryption in SDNs is unavailable in presently available devices or data processing systems. Thus, a substantial advancement of such devices or data processing systems by executing a method of an embodiment improves the security of the data that is communicated over SDNs.

The illustrative embodiments are described with respect to certain networking components, SDN components, encryption and decryption algorithms, keys, policies, conditions, packets, headers, bits, identifiers, indications, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
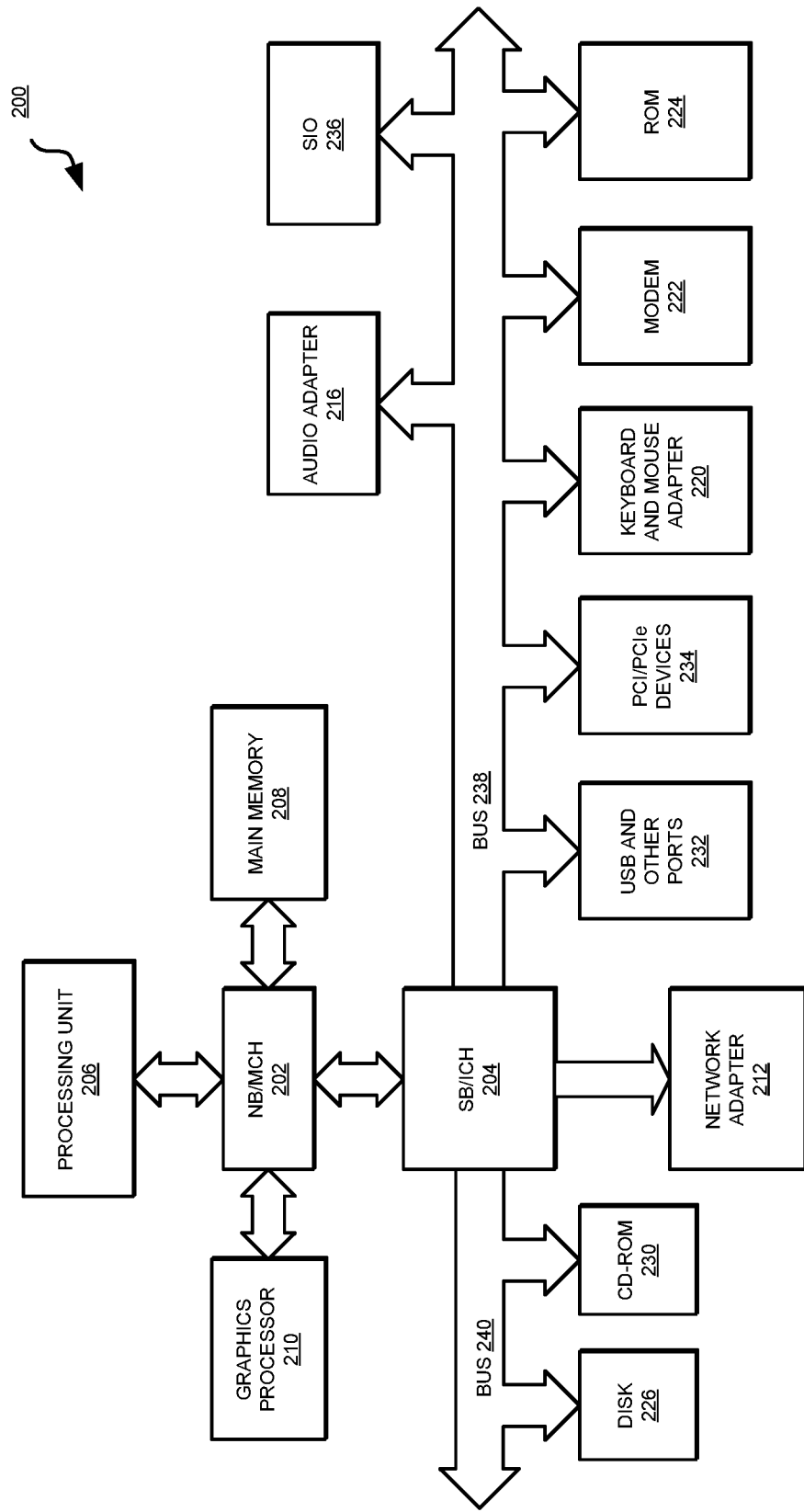
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device that can be configured for communicating over an SDN. Hypervisor 105 is an example logical abstraction of a hypervisor associated with server 104. Hypervisor 105 is modified according to an embodiment and operates in an SDN managed by SDN controller 107. SDN controller 107 is modified according to an embodiment described herein. Hypervisor 111 is another example logical abstraction of a hypervisor associated with client 110. Hypervisor 111 is modified according to an embodiment and operates in the SDN managed by SDN controller 107. Gateway 142 is another example logical abstraction of a gateway networking component. Gateway 142 is a modified SDN component according to an embodiment and operates in the SDN managed by SDN controller 107. Policies 109, algorithms 119, and optionally, keys 129 are used by SDN controller 107 in a manner according to an embodiment described herein. Generally, SDN components 105, 111, and 142 can be logical abstractions of any suitable networking components to operate in an SDN, and can be modified using an embodiment described herein within the scope of the illustrative embodiments.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 or gateway 142 in FIG. 1 in which computer usable program code or instructions implementing the processes of the illustrative embodiments may be located. Data processing system 200 is described as a computer only as an example, without being limited thereto. Implementations in the form of other devices, such as device 132 or gateway 142 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive or solid state drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as SDN components 105 and 111, or SDN controller 107 in FIG. 1, are located on storage devices, such as hard disk drive or solid state drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
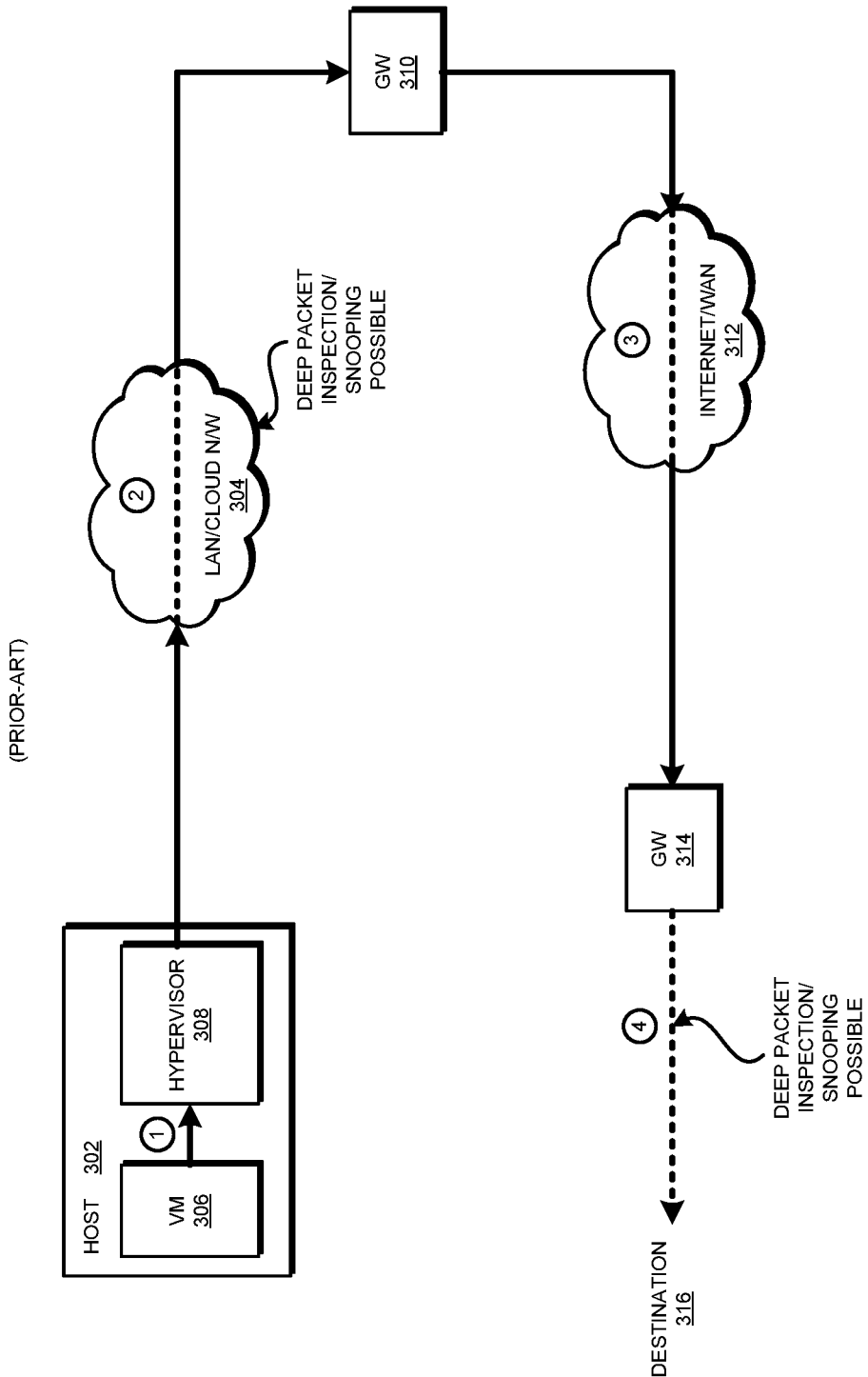
FIG. 3 depicts a block diagram of an example configuration in which an illustrative embodiment can be implemented.

With reference to FIG. 3, this figure depicts a block diagram of an example configuration in which an illustrative embodiment can be implemented. Host 302 can be implemented using server 104 in FIG. 1. Network 304 can be implemented using network 102 in FIG. 1.

Assume that VM 306 executes on host 302, and uses hypervisor 308 to send and receive data packets. Hypervisor 308 is a prior-art SDN component participating in a prior-art SDN depicted in FIG. 3. In some implementations, VM 306 executes within hypervisor 308, but the illustrative embodiments contemplate any suitable association between a packet sender and an SDN controller managed component on the overlay.

Network 304 is a LAN or a cloud network in a datacenter. Gateway 310 facilitates data communication between LAN 304 and WAN 312. Gateway 310 is also a prior art SDN component.

A network component corresponding to the logical representation of gateway 310 communicates with gateway 314. Gateway 314 operates on WAN 312. Gateway 314 sends and receives data packets for destination 316. Reaching destination 316 may cause the data packets to travel on another LAN (not shown), to another hypervisor or another networking component (not shown) in a physical network (not shown) or one or more SDN components (not shown) in another SDN (not shown).

Using this example configuration, assume that VM 306 sends a data packet to destination 316. The data packet follows internal path (1) in host 302 to hypervisor 308 in an unencrypted manner.

At the beginning of the SDN, hypervisor 308 transmits the data packet over segment (2) to gateway 310. Gateway 310 is the end of a flow in the SDN managed by an SDN controller (not shown).

The data packet over segment (2) remains unencrypted. Therefore, network 304, through which segment (2) passes, disadvantageously presents the undesirable opportunity for a user or a system to snoop into the data packet or perform deep packet inspection of the data packet.

Gateway-to-gateway communication is known to use encryption. Accordingly, a network component corresponding to the logical representation SDN component gateway 310 uses some encryption technique to encrypt the data packet for transmission over segment (3) via network 312 to network component gateway 314.

Gateway 314 can be a networking component if the network of segment (4) is a physical network. Gateway 314 can be a logical representation SDN component if the network of segment (4) is another SDN managed by another SDN controller (not shown). Regardless, gateway 314 decrypts the gateway-to-gateway message to recover the unencrypted data packet. Gateway 314 transmits the unencrypted data packet over segment (4) to destination 316. Again, disadvantageously, segment (4) presents the undesirable opportunity for a user or a system to snoop into the data packet or perform deep packet inspection of the data packet.

Figure 4:
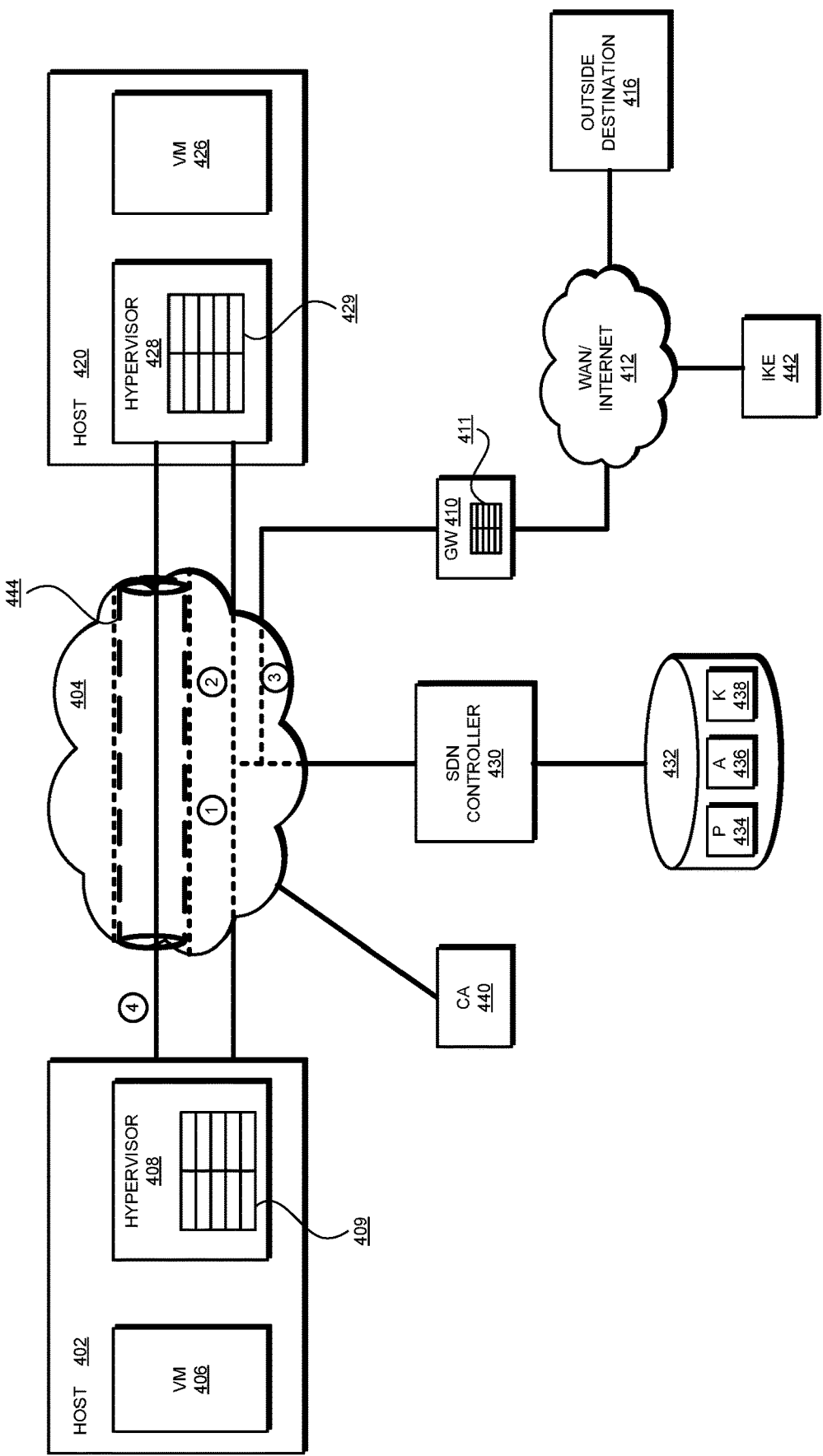
FIG. 4 depicts a block diagram of an example configuration for end-to-end encryption in a software defined network in accordance with an illustrative embodiment.

With reference to FIG. 4, this figure depicts a block diagram of an example configuration for end-to-end encryption in a software defined network in accordance with an illustrative embodiment. Host 402 is an example of host 302 in FIG. 3. SDN 404 is an overlay over network 304 in FIG. 3.

VM 406 is an example of VM 306 in FIG. 3. Hypervisor 408 is a modified SDN component according to an embodiment. Hypervisor 408 includes, accesses, or otherwise uses repository 409 as described elsewhere in this disclosure.

Gateway 410 is a modified SDN component according to an embodiment and operates on SDN 404. Gateway 410 includes, accesses, or otherwise uses repository 411 as described elsewhere in this disclosure. Gateway 410 operates to facilitate data communication between SDN 404 and another network, e.g., network 412, in a manner similar to gateway 310 in FIG. 3. Destination 416 is reachable on network 412 as described with respect to destination 316 in FIG. 3.

As an example, host 420 is another host operating on SDN 404. VM 426 executes in host 420, and uses hypervisor 428 to communicate over SDN 404. Hypervisor 428 is a modified SDN component according to an embodiment. Hypervisor 428 includes, accesses, or otherwise uses repository 429 as described elsewhere in this disclosure.

SDN controller 430 is a modified SDN controller according to an embodiment and manages SDN 404. SDN controller includes, accesses, or otherwise uses repository 432 as described herein. Repository 432 includes policies 434 and algorithms 436.

Optionally, repository 432 also includes encryption keys 438. SDN controller 430 may obtain one or more encryption keys from a key source, e.g., CA 440 or IKE 442, each of which may be available on the underlay of SDN 404 or on network 412, or both. SDN controller 430 may obtain a key, e.g., from CA 440 or IKE server 442, as needed in a communication with an SDN component, or may pre-obtain and store one or more keys as keys 438 in repository 432 for use or reuse in a later communication.

SDN controller 430 communicates with hypervisor 408 over path (1). For example, SDN controller 430 receives an indication of the availability of hypervisor 408 as well as information about hypervisor 408's encryption capabilities, cipher identifiers, and the like, as described in this disclosure, over path (1).

SDN controller 430 communicates with hypervisor 428 over path (2) in a similar manner for a similar purpose. SDN controller 430 communicates with gateway 410 over path (3) in a similar manner for a similar purpose.

SDN controller 430 sends or pushes information to hypervisor 408, hypervisor 428, and gateway 410, over paths (1), (2), and (3), respectively. Such information is preferably encrypted according to a pre-determined, pre-agreed, or pre-negotiated encryption as described in this disclosure. The information sent from SDN controller 430 over path (1) informs hypervisor 408 about the capabilities of other SDN components, such as the encryption capabilities and ciphers supported by hypervisor 428 and gateway 410. The communication over path (1) also sends a subset of policies 434 and algorithms 436 to hypervisor 408, as may apply to possible flows in SDN 404 involving hypervisor 408. Hypervisor 408 saves such information received from SDN controller 430 in repository 409.

Similarly, the information sent or pushed from SDN controller 430 over path (2) informs hypervisor 428 about the capabilities of other SDN components, such as the encryption capabilities and ciphers supported by hypervisor 408 and gateway 410. The communication over path (2) also sends a subset of policies 434 and algorithms 436 to hypervisor 428, as may apply to possible flows in SDN 404 involving hypervisor 428. Hypervisor 428 saves such information received from SDN controller 430 in repository 429.

The information sent or pushed from SDN controller 430 over path (3) similarly informs gateway 410 about the capabilities of other SDN components, such as the encryption capabilities and ciphers supported by hypervisor 408 and hypervisor 428. The communication over path (3) also sends a subset of policies 434 and algorithms 436 to gateway 410, as may apply to possible flows in SDN 404 involving gateway 410. Gateway 410 saves such information received from SDN controller 430 in repository 411.

For example, flow (4) is possible between hypervisor 408 and hypervisor 428. Flow (4) utilizes tunnel 444 through SDN 404. Hypervisor 408 is the beginning SDN component of flow (4) and hypervisor 428 is the ending SDN component of flow (4).

As an example, when VM 406 has to send a packet to VM 426, hypervisor 408 encrypts the packet at the origin end of flow (4) using that information from repository 409, which applies to flow (4). To perform an encryption according to such information, hypervisor 408 uses an encryption key. In one embodiment, the key is communicated from SDN controller 430 over path (1). In another embodiment, hypervisor 408 obtains the key from CA 440 or IKE server 442.

Hypervisor 428 decrypts the encrypted packet at the destination end of flow (4) using that information from repository 429, which applies to flow (4). To perform an decryption according to such information, hypervisor 428 uses a decryption key. In one embodiment, the decryption key is communicated from SDN controller 430 over path (2). In another embodiment, hypervisor 428 obtains the decryption key from CA 440 or IKE server 442.

Figure 5:
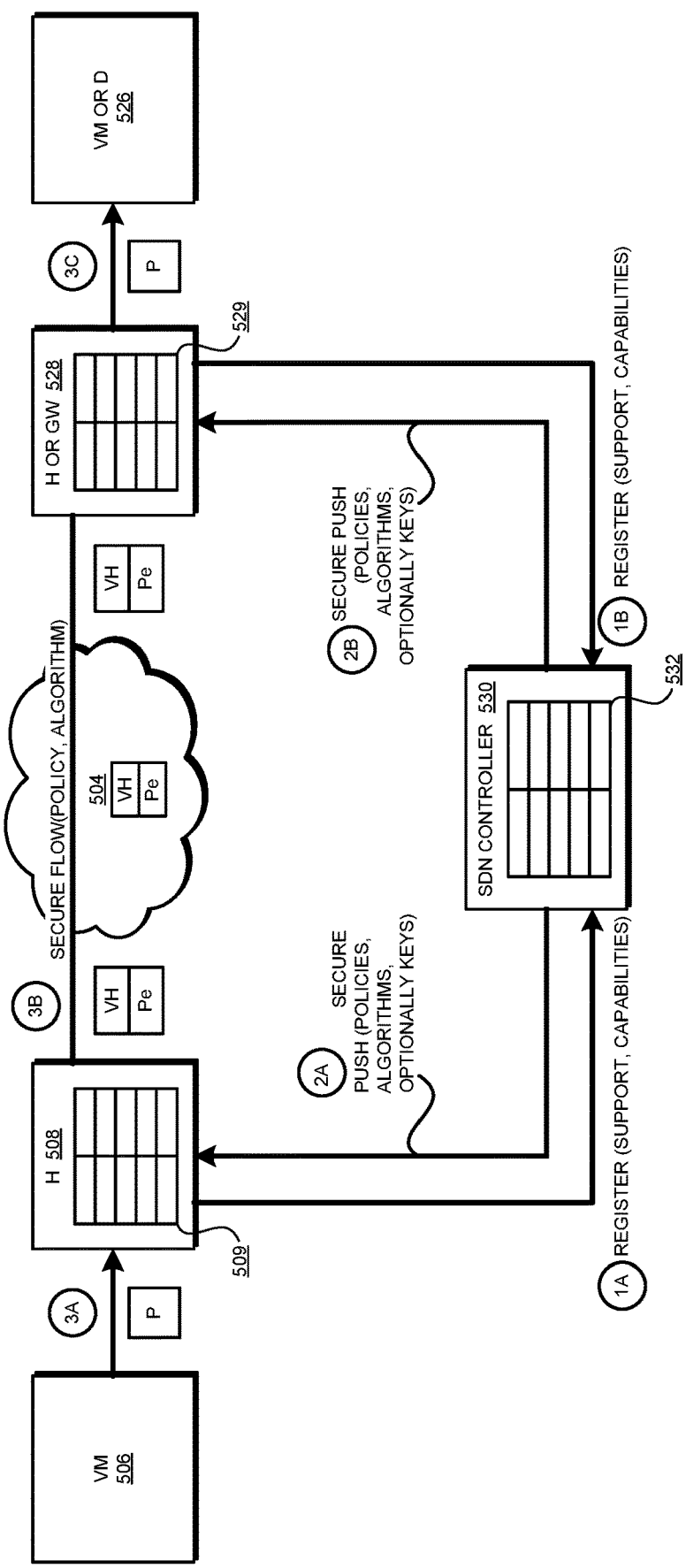
FIG. 5 depicts a block diagram of an example end-to-end encryption in a software defined network operation in accordance with an illustrative embodiment.

With reference to FIG. 5, this figure depicts a block diagram of an example end-to-end encryption in a software defined network operation in accordance with an illustrative embodiment. VM 506 is an example of VM 406 in FIG. 4. Hypervisor 508 and repository 509 comprise an example SDN component in the manner of hypervisor 408 and repository 409, respectively, in FIG. 4.

SDN component 528 and repository 529 comprise an example SDN component. For example, SDN component 528 and repository 529 can be examples of hypervisor 428 and repository 409, respectively, in FIG. 4, or gateway 410 and repository 411, respectively, in FIG. 4. Destination 526 can be an example of VM 426 or destination 416 in FIG. 4. SDN controller 530 configures SDN components 508 and 528 to operate on SDN 504 as described with respect to FIG. 4.

In operation 1A, SDN component 508 registers with SDN controller 530 and indicates SDN component 508's availability on SDN, encryption capabilities, and supported ciphers. Similarly, in operation 1B, SDN component 528 registers with SDN controller 530 and indicates SDN component 528's availability on SDN, encryption capabilities, and supported ciphers. SDN 530 maintains such supplied information in repository 532.

In operation 2A, preferably securely, SDN controller 530 pushes zero or more policies and zero or more algorithms to SDN component 508. Similarly, in operation 2B, preferably securely, SDN controller 530 pushes zero or more policies and zero or more algorithms to SDN component 528. The numbers of policies and algorithms pushed in operations 2A and 2B depend on a variety of circumstances described elsewhere in this disclosure.

In operation 3A, VM 506 operates as a sender of packet "P." Using information in repository 509, SDN component 508 encrypts packet P to form encrypted payload "Pe" before packet P is sent on any segment of SDN 504. SDN component 508 further configures header "VH" to facilitate the routing of payload Pe over SDN 504 to destination 526.

In operation 3B, SDN component 508 sends new packet "VH+Pe" over SDN 504. SDN component 528 receives the new packet VH+Pe. At the end of the new packet's journey over SDN 504, using information in repository 529, SDN component 528 decrypts payload Pe to recover packet P. In operation 3C, SDN component 528 passes packet P to destination 526, e.g., using an internal bus, memory, or data storage at a host system.

Figure 6:
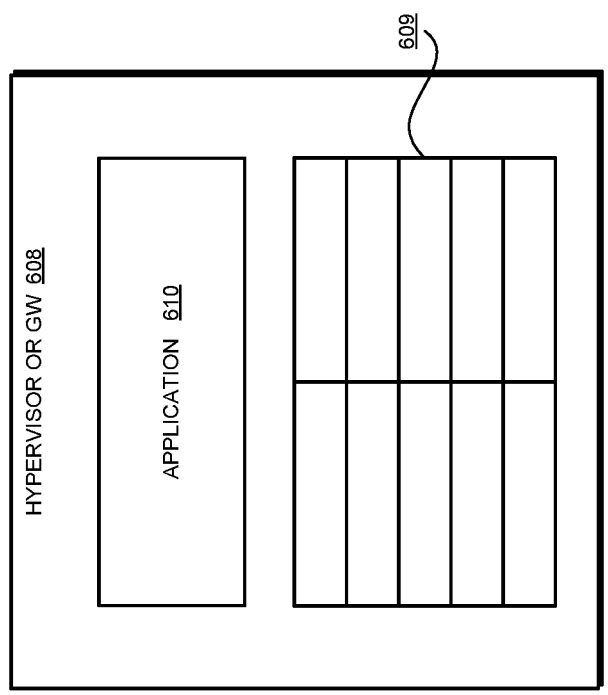
FIG. 6 depicts a block diagram of an example configuration of an SDN component in accordance with an illustrative embodiment.

With reference to FIG. 6, this figure depicts a block diagram of an example configuration of an SDN component in accordance with an illustrative embodiment. SDN component 608 can be used as SDN component 508 or 528 in FIG. 5. Repository 609 corresponds to repository 509 or 529 accordingly.

Application 610 implements an embodiment in software. Application 610 when executed with a prior art SDN component, with access to repository 609 modifies the prior-art SDN component (not shown) to operate in the manner of a modified SDN component as described herein, to wit, as SDN component 608.

Figure 7:
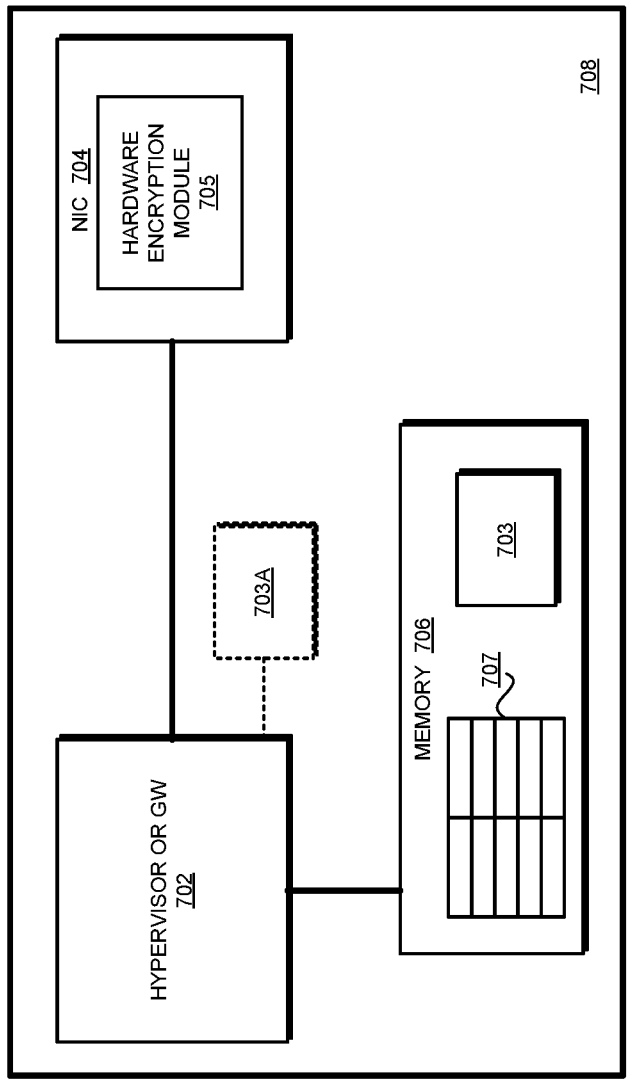
FIG. 7 depicts a block diagram of another example configuration of an SDN component in accordance with an illustrative embodiment.

With reference to FIG. 7, this figure depicts a block diagram of another example configuration of an SDN component in accordance with an illustrative embodiment. Modified SDN component 708 can be used as SDN component 508 or 528 in FIG. 5. Repository 707 corresponds to repository 509 or 529 accordingly.

SDN component 702 is a prior-art SDN component, e.g., a hypervisor or a gateway without the benefit of an embodiment. Network interface card (NIC) 704 comprises encryption module 705. Module 705 comprises a hardware implementation to perform encryption. Memory 706 is any suitable data storage device accessible to prior-art SDN component 702.

In one embodiment, application 703 implements an embodiment in software. In another embodiment, the logic of application 703 is implemented in hardware 703A. Implementations 703 and 703A are mutually exclusive.

Application 703 in combination with module 705 and repository 707, when applied to prior-art SDN component 702, forms modified SDN component 708. For example, application 703 when executed with prior art SDN component 702, accesses repository 707 and module 705, and performs the registration, encryption, and decryption operations as described with respect to FIG. 5.

Figure 8:
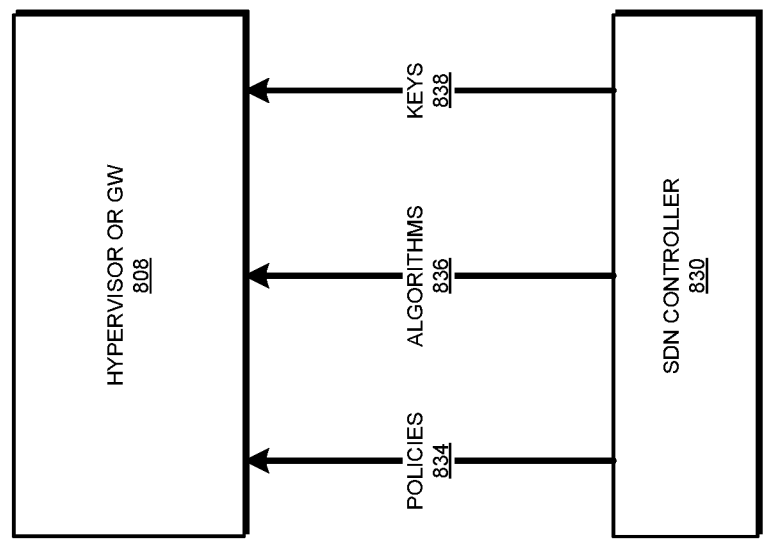
FIG. 8 depicts a block diagram of an example configuration for pushing information from an SDN controller in accordance with an illustrative embodiment.

With reference to FIG. 8, this figure depicts a block diagram of an example configuration for pushing information from an SDN controller in accordance with an illustrative embodiment. SDN component 808 can be implemented as modified SDN component 508 or modified SDN component 528 in FIG. 5. SDN controller 830 can be implemented as modified SDN controller 530 in FIG. 5.

According to one embodiment, modified SDN controller 830 pushes set 834 of policies, set 836 of algorithms, and set 838 of encryption and/or decryption keys to SDN component 808. Set 834 of policies may include the actual policy logic or code, an identifier of a policy, a reference to a logic or code of a policy stored in a location accessible to both SDN component 808 as well as SDN controller 830, or a combination thereof. Set 834 may include zero or more policies in this manner.

Set 836 of algorithms may similarly include an actual algorithm, an identifier of an algorithm obtainable from a storage, a reference to a logic or code of an algorithm stored in a location accessible to both SDN component 808 as well as SDN controller 830, or a combination thereof. Set 836 may include zero or more algorithms in this manner.

Set 838 of keys may similarly include an actual key, an identifier of a key obtainable from a storage, a reference to a code or source of a key accessible to both SDN component 808 as well as SDN controller 830, or a combination thereof. Set 838 may include zero or more keys in this manner.

Figure 9:
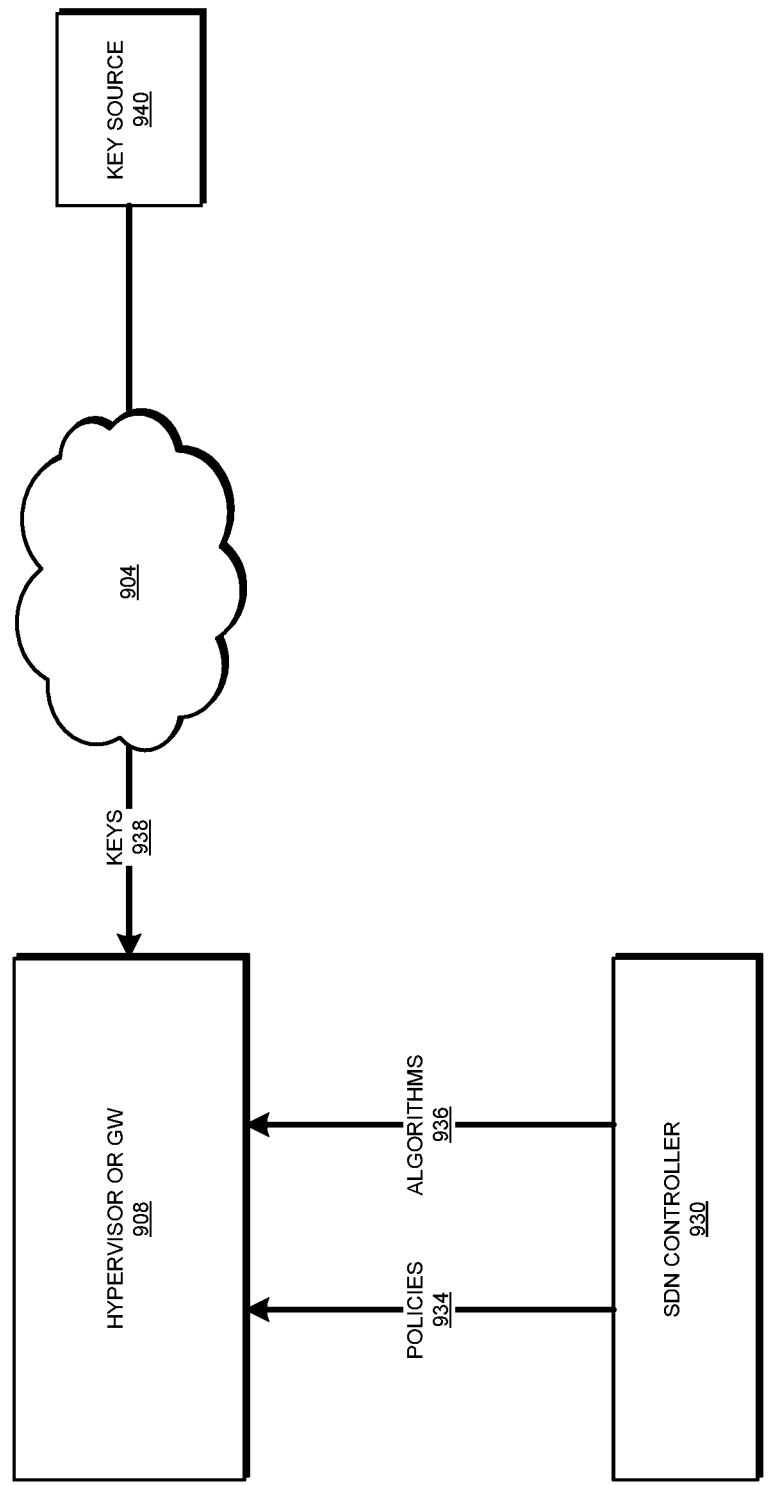
FIG. 9 depicts a block diagram of another example configuration for pushing information from an SDN controller in accordance with an illustrative embodiment.

With reference to FIG. 9, this figure depicts a block diagram of another example configuration for pushing information from an SDN controller in accordance with an illustrative embodiment. SDN component 908 is an example of modified SDN component 508 or modified SDN component 528 in FIG. 5. SDN controller 930 can be implemented as modified SDN controller 530 in FIG. 5. Network 904 can be an example of SDN 404 or network 412 in FIG. 4. Key source 440 can be an example of CA 440 or IKE server 442 in FIG. 4.

According to one embodiment, modified SDN controller 930 pushes set 934 of policies and set 936 of algorithms to SDN component 908. Set 934 can include contents in the manner of set 834 and set 936 can include contents as in set 836, respectively, in FIG. 8. SDN component 908 obtains set 938 of keys from key source 940 separately. Set 938 can include contents as in set 838 in FIG. 8.

In one embodiment, SDN component 908 obtains one or more keys in set 938 prior to receiving a packet, such as packet P in FIG. 5, for encryption. In another embodiment, SDN component 908 obtains one or more keys in set 938 after receiving a packet, such as packet P in FIG. 5, for encryption.

Figure 10:
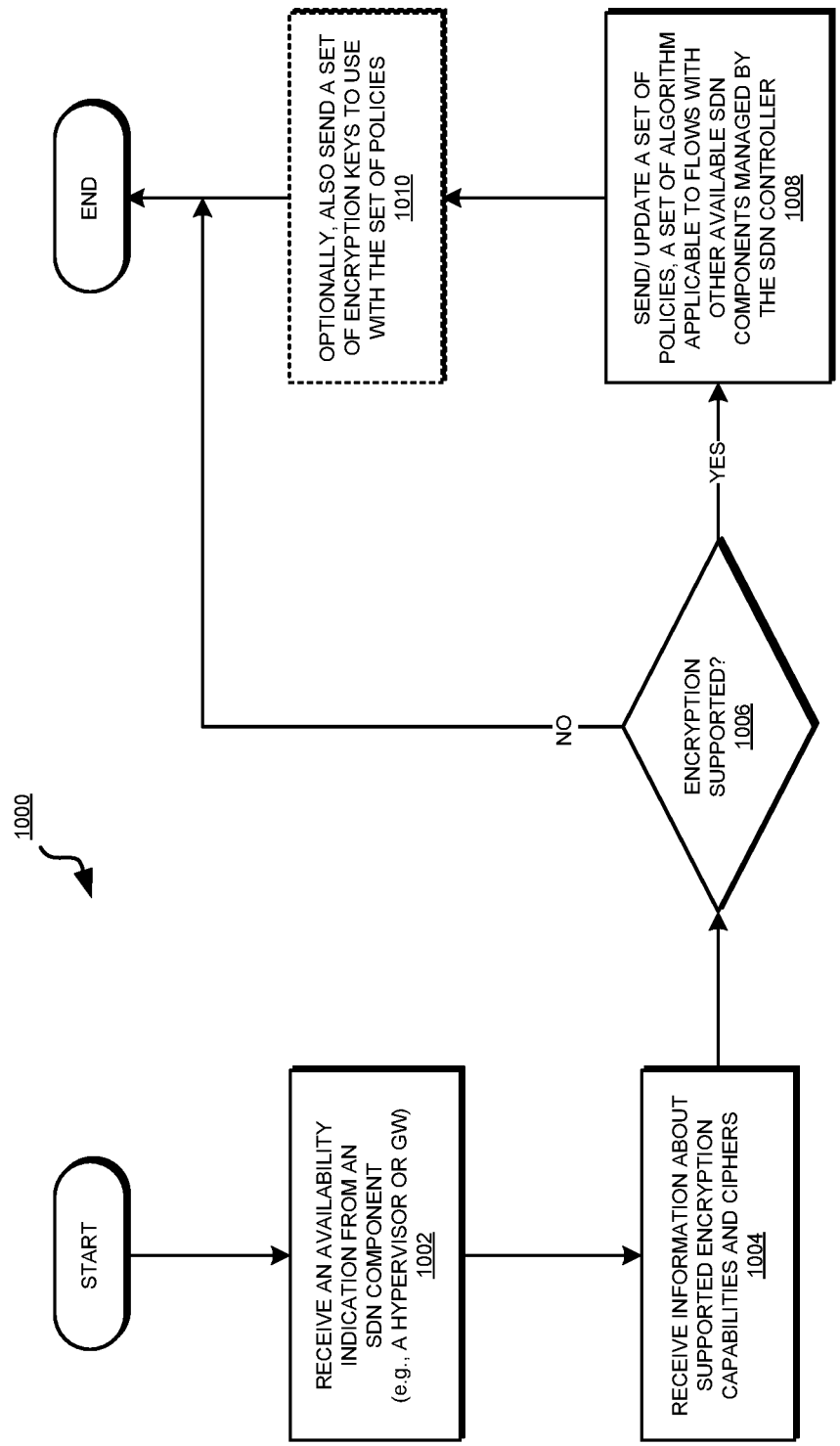
FIG. 10 depicts a flowchart of an example process for configuring an SDN for end-to-end encryption in accordance with an illustrative embodiment.

With reference to FIG. 10, this figure depicts a flowchart of an example process for configuring an SDN for end-to-end encryption in accordance with an illustrative embodiment. Process 1000 can be implemented in a modified SDN controller, such as modified SDN controller 830 in FIG. 8 or modified SDN controller 930 in FIG. 9.

The modified SDN controller receives an indication of the availability of a SDN component (block 1002). The modified SDN controller receives information about the supported encryption capabilities and ciphers at the SDN component (block 1004).

The modified SDN controller determines whether the SDN component supports encryption (block 1006). If the SDN component supports encryption ("Yes" path of block 1006), the modified SDN controller sends or pushes a new or updated set of policies and a new or updated set of algorithms that are applicable to the flows between the SDN component and other available SDN components that are managed by the SDN controller (block 1008).

Optionally, the modified SDN controller also sends or pushes a new or updated set of encryption and/or decryption keys that correspond to the set of algorithms and policies sent in block 1008 (block 1010). The modified SDN controller ends process 1000 thereafter. Returning to block 1006, if the SDN component does not support encryption ("No" path of block 1006), the modified SDN controller ends process 1000 thereafter.

Figure 11:
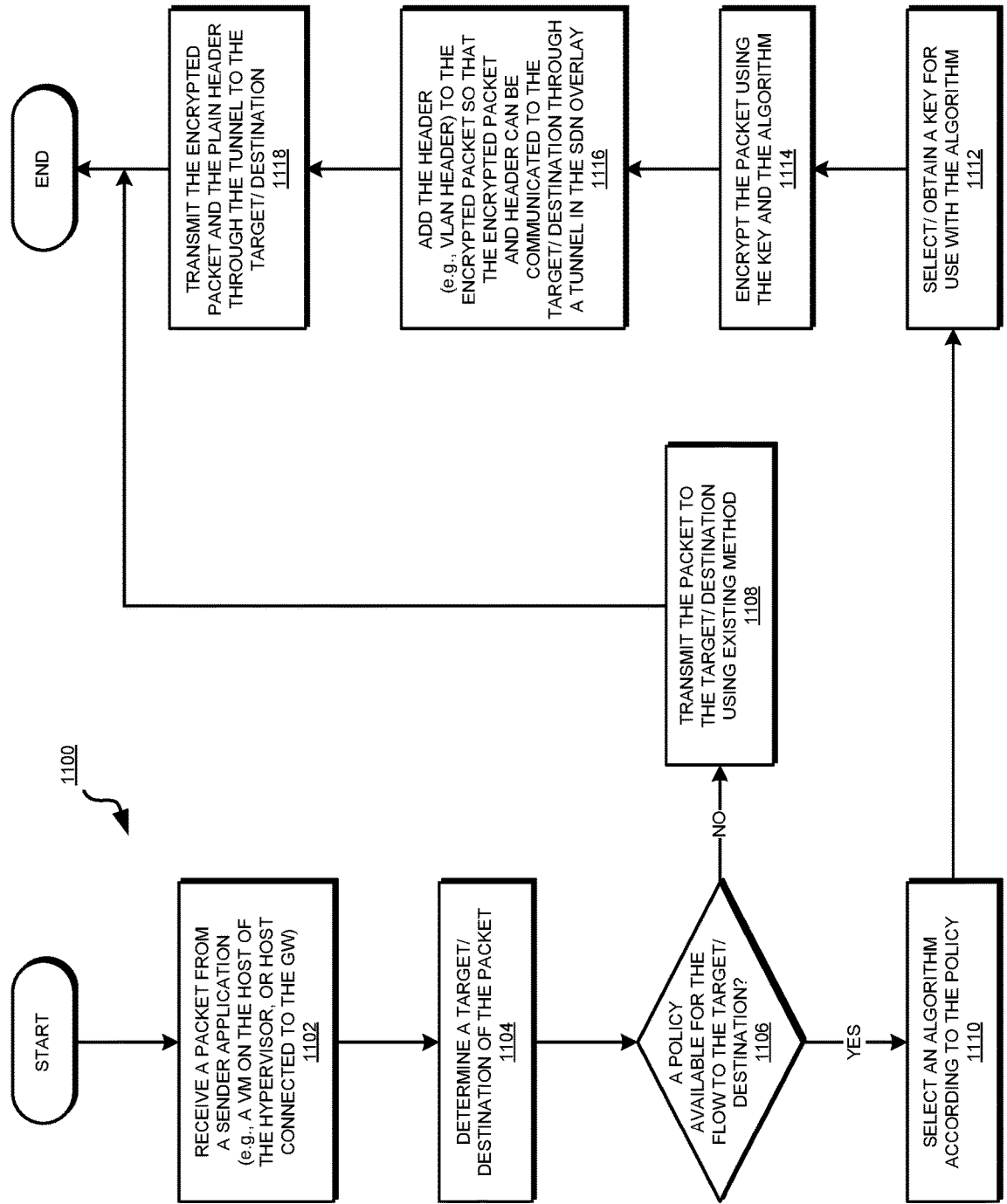
FIG. 11 depicts a flowchart of an example process for end-to-end encryption in a software defined network in accordance with an illustrative embodiment.

With reference to FIG. 11, this figure depicts a flowchart of an example process for end-to-end encryption in a software defined network in accordance with an illustrative embodiment. Process 1100 can be implemented in a modified SDN component, such as in modified SDN component 808 in FIG. 8 or modified SDN component 908 in FIG. 9.

The modified SDN component receives a packet from a sender application, such as from a VM executing on the same host as a modified hypervisor or from a VM executing on a host connected to a modified gateway (block 1102). The modified SDN component determines a target or destination of the packet (block 1104).

The modified SDN component determines whether a policy is available for the flow from the modified SDN component to the destination (block 1106). If no policy is available ("No" path of block 1106), such as when an SDN component associated with the destination is not modified with an embodiment, the modified SDN component transmits the packet to the destination using an existing method without the benefit of an embodiment (block 1108). The modified SDN component ends process 1100 thereafter.

If a policy is available ("Yes" path of block 1106), the modified SDN component selects an algorithm according to the policy (block 1110). The modified SDN component selects or obtains an encryption key to use with the selected algorithm (block 1112). The modified SDN component encrypts the packet using the key and the algorithm (block 1114).

The modified SDN component adds a plain text readable header, e.g., a virtual LAN header usable to route the encrypted packet over the SDN to the destination of the original packet (block 1116). The modified SDN component transmits the encrypted packet through a tunnel in the SDN to the destination of the original packet (block 1118). The modified SDN component ends process 1100 thereafter.

Thus, a computer implemented method, system or apparatus, and computer program product are provided in the illustrative embodiments for end-to-end encryption in a software defined network. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for end-to-end securing of data communications in a Software Defined Network (SDN), the method comprising:
    receiving, at a controller of the SDN, first information from a first component of the SDN, the first information comprising an identification of an encryption algorithm from a set of encryption algorithms supported by the first component;
    preventing, using a set of policies transmitted in encrypted form from the controller to the first component, the first component from using a first subset of the set of encryption algorithms on a path in the SDN between the first component and a second component of the SDN, even though the first subset of encryption algorithms is supported at the first component and the second component, wherein the set of policies comprises the first subset of the set of encryption algorithms; and
    causing, using the set of policies transmitted in encrypted form from the controller to the first component, a selection at the first component of a cryptographic operation from a second subset of the set of encryption algorithms, the cryptographic operation being applicable to the path.

2. The method of claim 1, further comprising:
    detecting, at the controller, an availability of a third component of the SDN;
    selecting, responsive to detecting the availability of the third component, a second set of policies; and
    updating the set of policies with the second set of policies, such that a policy in the second set of policies determines a second cryptographic operation applicable to a second path in the SDN between the first component and the third component of the SDN, wherein the first component comprises an originating point of the second path and the third component comprises a destination point of the second path.

3. The method of claim 1, further comprising:
    causing, responsive to sending the set of policies and the set of encryption algorithms, the first component to use a policy from the set of policies to perform a cryptographic operation on a data packet using an encryption algorithm determined by the policy, forming a secure data packet, a destination of the data packet being associated with the second component and reachable via the path in the SDN.

4. The method of claim 3, further comprising:
    causing, responsive to sending the set of policies and the set of encryption algorithms, the first component to construct an unencrypted header, wherein the unencrypted header is usable to route the secure data packet to the second component in the SDN; and
    causing the first component to transmit the secure data packet with the unencrypted header on the path in the SDN to the second component.

5. The method of claim 1, further comprising:
    performing a cryptographic operation, at the controller, using a pre-negotiated encryption algorithm, the set of policies and the set of encryption algorithms, wherein the pre-negotiated encryption algorithm is pre-negotiated between the controller and the first component.

6. The method of claim 1, further comprising:
    sending, to the first component, a set of encryption keys, wherein an encryption key in the set of encryption keys corresponds to an encryption algorithm in the set of encryption algorithms.

7. The method of claim 1, wherein the policy determining the encryption comprises the policy identifying a second encryption algorithm, and wherein the second encryption algorithm performs the determined cryptographic operation on data on the path.

8. The method of claim 1, wherein the set of encryption algorithms includes the encryption algorithm.

9. The method of claim 1, the first information further comprising an indication of an availability of a cryptographic capability at the first component.

10. The method of claim 1, further comprising:
    receiving, at the controller, an indication that the first component is available for data communications in the SDN.

11. The method of claim 1, wherein the first component comprises a logical representation of a component of a physical network, wherein the SDN comprises a virtual network logically overlaid on the physical network.

12. The method of claim 1, wherein the first component comprises a logical representation of a hypervisor, the hypervisor operating in a data processing system accessible over the SDN.

13. A method for end-to-end securing of data communications in a Software Defined Network (SDN), the method comprising:
    sending, from a first component of the SDN to a controller of the SDN, first information comprising an identification of an encryption algorithm supported by the first component;
    preventing, using a set of policies received at the first component transmitted in encrypted form from the controller, the first component from using a first subset of the set of encryption algorithms on a path in the SDN between the first component and a second component of the SDN even though the first subset of encryption algorithms is supported at the first component and the second component, wherein the set of policies comprises the first subset of the set of encryption algorithms; and
    performing a cryptographic operation, using a policy from the set of policies, on a data packet using an encryption algorithm determined by the policy, forming a secure data packet, a destination of the data packet being associated with the second component and reachable via the path in the SDN.

14. The method of claim 13, further comprising:
    constructing, responsive to performing the cryptographic operation, an unencrypted header, wherein the unencrypted header is usable to route the secure data packet to the second component in the SDN; and
    transmitting the secure data packet with the unencrypted header on the path in the SDN to the second component.

15. The method of claim 13, further comprising:
    determining, whether any policy in the set of policies applies to the path between the first component and the second component in the SDN;
    selecting, responsive to determining that the policy in the set of policies applies to the path, the policy from the set of policies; and executing the policy to identify the encryption algorithm in the set of encryption algorithms.

16. A computer program product for end-to-end securing of data communications in a Software Defined Network (SDN), the computer program product comprising:

one or more computer-readable storage mediums;

program instructions, stored on at least one of the one or more storage mediums, the program instructions comprising:

code to receive, at a controller of the SDN, first information from a first component of the SDN, the first information comprising an identification of an encryption algorithm from a set of encryption algorithms supported by the first component;

code to prevent, using a set of policies transmitted in encrypted form from the controller to the first component, the first component from using a first subset of the set of encryption algorithms on a path in the SDN between the first component and a second component of the SDN, even though the first subset of encryption algorithms is supported at the first component and the second component, wherein the set of policies comprises the first subset of the set of encryption algorithms; and code to cause, using the set of policies transmitted in encrypted form from the controller to the first component, a selection at the first component of a cryptographic operation from a second subset of the set of encryption algorithms, the cryptographic operation being applicable to the path.

17. The computer program product of claim 16, further comprising:

code to detect, at the controller, an availability of a third component of the SDN;

code to select, responsive to detecting the availability of the third component, a second set of policies; and code to update the set of policies with the second set of policies, such that a policy in the second set of policies determines a second cryptographic operation applicable to a second path in the SDN between the first component and the third component of the SDN, wherein the first component comprises an originating point of the second path and the third component comprises a destination point of the second path.

18. The computer program product of claim 16, further comprising:

code to cause, responsive to sending the set of policies and the set of encryption algorithms, the first component to use a policy from the set of policies to perform a cryptographic operation on a data packet using an encryption algorithm determined by the policy, forming a secure data packet, a destination of the data packet being associated with the second component and reachable via the path in the SDN.

19. The computer program product of claim 18, further comprising:

code to cause, responsive to sending the set of policies and the set of encryption algorithms, the first component to construct an unencrypted header, wherein the unencrypted header is usable to route the secure data packet to the second component in the SDN; and code to cause the first component to transmit the secure data packet with the unencrypted header on the path in the SDN to the second component.

20. The computer program product of claim 16, further comprising:

code to perform a cryptographic operation, at the controller, using a pre-negotiated encryption algorithm, the set of policies and the set of encryption algorithms, wherein the pre-negotiated encryption algorithm is pre-negotiated between the controller and the first component.

* * * * *